Patented Apr. 19, 1932

1,854,348

UNITED STATES PATENT OFFICE

GUSTAV RODEWALD, OF JENA, GERMANY, ASSIGNOR TO THE AMBER SIZE & CHEMICAL COMPANY LIMITED, OF LONDON, ENGLAND

TREATMENT OF ROAD MAKING MATERIALS

No Drawing. Application filed March 12, 1930, Serial No. 435,360, and in Germany March 18, 1929.

This invention relates to the treatment of road making materials.

In modern road and street construction the use of bitumen or tar emulsions for the carpeting or covering of road surfaces and for the saturation or enveloping of the stone aggregate used is becoming daily of increasing importance. The advantages which these so-called "cold processes" possess, as against the "hot processes", have been to some extent minimized up to the present by various disadvantages, among which are specially apparent the insufficient wetting, enveloping and penetration power of bituminous or tar emulsions which are used cold and the consequent limitation of the use of these emulsions for the purposes indicated.

These disadvantages are especially apparent in the production of the so-called concrete or tar macadam mixtures. In the case of these mixtures the emulsions used settle out prematurely, that is to say, the dispersed material coagulates and separates before the stone surface is completely enveloped and coated.

The present invention is based upon the discovery that these disadvantages can be overcome if to the bitumen or tar emulsions prepared in the usual way with the use of the ordinary emulsifying agents and stabilizers there are added, for example immediately before their application, solutions which contain pyridine, pyridine derivatives, compounds of pyridine, or bodies related to pyridine, which bodies are hereinafter referred to generically as "azocyclic bases". The solutions in question increase the wetting, penetration and enveloping power of such emulsions in an unexpected and hitherto unknown way. In some cases such solutions are employed in a highly dilute state, while in other cases relatively concentrated solutions may be used and for the purpose of the invention industrial waste liquors in which the materials mentioned are contained may be employed.

The concentration of the solutions of the materials named need only be very low and may be between 0.1 and 3 per cent. The quantities to be added to the emulsions need not exceed 1–5 per cent. calculated on the weight of the emulsion and will be adjusted according to the surface of the stone aggregate to be treated.

Equal efficacy is attained if, before the stone aggregate, road surfaces and the like are coated or treated with the usual emulsions, they are subjected to treatment with liquids containing the materials named (pyridine or the like) in solution and of a concentration of 0.1 to 5 per cent; 1–2 per cent. of the solution relative to the weight of stone aggregate or the like being used.

Example I 100 kg. of a tar or bitumen emulsion manufactured in the usual way with water, after the actual emulsification has been effected, are thoroughly mixed with 3 kg. of a solution containing about 1 per cent. of pyridine. 20 to 25 kgs. of the emulsion so prepared will cover or penetrate completely 300 kg. of chippings of 10–30 mm.

Example II 300 kg. of chippings of 10–30 mm. size contained in a mixing drum is sprinkled with 1½–3 kg. of a 0.5–2 per cent. solution or liquid containing 0.1–5 per cent. pyridine or its derivatives, the mixing drum being then given a few turns whereby the chippings will be completely wetted as will be evidenced by their becoming darker in colour. After this treatment the mixing of the chippings with the tar or bitumen emulsion is effected and a complete coating of the stone results if 20–25 kg. of the emulsion is used.

Having now described my invention, what I claim as new and desire to secure by Letters Patent is:—

1. A process of treating road making materials which comprises subjecting the same to treatment with solutions containing azocyclic bases, and subsequently treating the road making materials with bituminous emulsions.

2. A process of treating road making materials which comprises subjecting the same to treatment with solutions containing pyridine bases, and subsequently treating the road making materials with bituminous emulsions.

3. A process of treating road making materials which comprises subjecting the same to treatment with solutions containing industrial waste liquors containing pyridine bases and thereafter treating the road making materials before impregnation thereof with bituminous emulsions.

4. A process of treating road making materials with tar emulsions which comprises subjecting the same to treatment with solutions containing pyridine and thereafter impregnating the said materials with tar emulsions.

In testimony whereof I have signed my name to this specification.

GUSTAV RODEWALD.